I. BUCCERI.
INHALER.
APPLICATION FILED DEC. 23, 1909.

962,617.

Patented June 28, 1910.

Witnesses:
W. A. Hutton
J. O. Gempler

Ignazio Bucceri,
Inventor,
By his Attorneys,
Kenyon & Kenyon.

UNITED STATES PATENT OFFICE.

IGNAZIO BUCCERI, OF BROOKLYN, NEW YORK, ASSIGNOR OF ONE-HALF TO FRANCISCO RICART, OF NEW YORK, N. Y.

INHALER.

962,617.  Specification of Letters Patent.   Patented June 28, 1910.

Application filed December 23, 1909. Serial No. 534,627.

*To all whom it may concern:*

Be it known that I, IGNAZIO BUCCERI, a subject of the King of Italy, and a resident of Brooklyn, in the county of Kings, State of New York, have invented certain new and useful Improvements in Inhalers, of which the following is a specification.

My invention relates to inhalers and more particularly to tubular inhalers which may be held in the mouth.

The object of my invention is to produce a very inexpensive inhaler made to represent a cigar and containing chemicals such that the vapors given off therefrom when combined will produce a vapor the color of tobacco smoke, and having a very agreeable taste. Such inhalers are not only conveniently carried around, but are of particular value to those who smoke.

Other objects of my invention will more fully appear from the following description taken in connection with the accompanying drawings in which—

Figure 1:
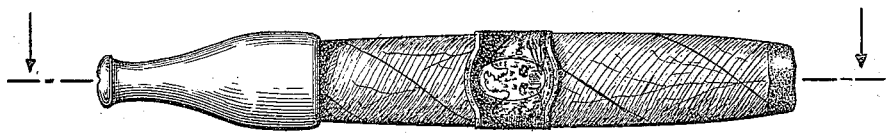
Figure 2:
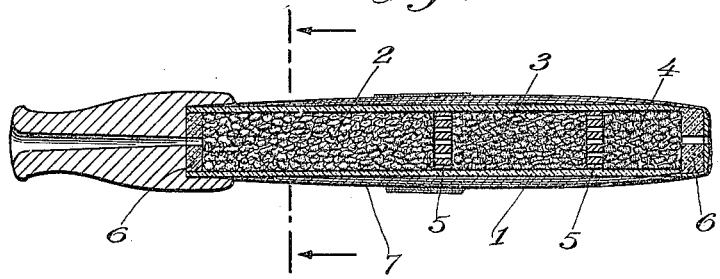
Figure 3:
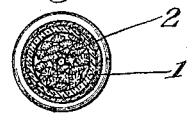

Figure 1 is an assembled view of the inhaler, Fig. 2 is a longitudinal sectional view of the same, and Fig. 3 is a cross-sectional view thereof.

Referring to the drawings, 1 is a tube preferably of glass which is divided into compartments 2, 3 and 4 by means of suitable partitions 5, the tube being closed at its ends preferably by means of stoppers 6, 6; the partitions and stoppers being preferably of some substance that can be readily perforated when the inhaler is ready for use, so as to permit the passage of air therethrough from one compartment to the next. The compartments are filled with an absorbent medium, preferably pumice stone which has been saturated or impregnated with suitable chemicals. When the vapors given off from hydrochloric acid and ammonia are brought together, a vapor ammonium chlorid is given off, which is inoffensive and in color resembles tobacco smoke, and I make use of this phenomenon in my inhaler and construct the same in the form of a cigar in order that it may appeal to those addicted to smoking.

The ingredients of the inhaler are prepared in the following manner. I take a suitable quantity of pumice stone and allow it to absorb a suitable amount of concentrated hydrochloric acid after which it is placed in the tube. I then place absorbent cotton, or a mixture of wax and resin or some other suitable material upon the pumice stone so as to hold it in one part of the tube, after which I take a suitable quantity of pumice stone which has been treated with menthol and place this in the tube, after which another partition is formed in the tube, and I then take a suitable amount of pumice stone which has been saturated with concentrated ammonia or ammonia-carbonate and place this in the tube, after which the end of the tube is closed by a suitable stopper, such as specially treated cork, beeswax or a composition of wax and resin.

The partitions between the absorbent medium, for dividing the tube into compartments may be of any substance which will separate the absorbent medium and be readily perforated to permit the passage of air through the tube from one compartment to the other when ready for use, such as wax, wax and resin or specially treated cardboard or cork. For forming the partitions I prefer to use a compound of wax and resin which I mix together and heat to form a partition which I find will not be dissolved by the acid or other chemicals used and which, while holding the absorbent material in place and preventing the passage of the vapor therefrom from one compartment to the next or the evaporation of the same, can be readily perforated when the tube is ready for use so as to permit the passage of air through the tube from one compartment to the next.

The presence of the resin in the wax, due to its adhesive quality when heated, acts as a binder, so to speak, forming a firmer partition which adheres closely to the walls of the tube. With the partitions thus formed, it has been found that after they are perforated for use, if the tube is put aside for awhile, the opening gradually seals itself or closes up, thus preventing any unnecessary waste of the chemicals in the different compartments when the inhaler is not being used. I have found that these partitions may be formed of ordinary loose cotton, but due to the gradual evaporation and mixing of the vapors from the different chemicals with which the pumice stone is impregnated, the life of the inhaler is considerably shortened, whereas when the tube is divided into air tight compartments, there is no evaporation or mingling of the chemicals from the different compartments, so that the tube may be handled with a great deal less care and may be kept indefinitely, without any appreciable exhaustion of the chemicals therein contained. When the partitions are thus constructed it is only necessary to pierce the partitions and stopper by means of a long needle or rod which accompanies each inhaler. I have found this feature of inclosing the chemicals in air tight compartments until ready for use to be of great importance from a commercial standpoint. After the tube has been filled with the chemically impregnated pumice stone, the end is closed in the manner described and I preferably stretch a piece of waxed paper over the end, after which the tube is wrapped with a brown tissue paper 7 to represent tobacco leaf, after which a suitable substance such as gum or cement with or without additional coloring matter is smeared on the outer end of the tube and over the stopper in order to produce a rough effect representing ashes. This may be done by applying the cement or glue to the end of the tube and over the stopper or else by dipping the end of the tube into a solution. I prefer to use beeswax for stopping up the outer end of the tube and over this beeswax is spread a piece of waxed paper which is held in position by the brown tissue paper wrapped upon the tube, and after this the end of the tube is dipped into a suitable solution for giving the desired effect to the end of the inhaler.

By utilizing a single tube divided transversely into compartments I am enabled to greatly reduce the cost of manufacture of the inhaler since a longitudinally divided tube or two separate parallel tubes are not only more expensive, but they are hard to form and properly wrap into the shape of a cigar, and I have found that the vapors are more thoroughly mixed when the air is inhaled through the compartments arranged as shown in my invention; and also that with a given amount of chemical ingredients the inhaler will last considerably longer when the compartments are arranged as shown herein, that is, so that the air will pass from one compartment into the next in being inhaled. This is probably due to the fact that the air becomes partly laden with the chemical in the first compartment before it reaches the chemicals in the succeeding compartments, so that it will not take up as much of the other chemicals as it would if the air were drawn directly through separate compartments, in which case more of each of the chemicals would be taken up by the air with a corresponding waste, causing the inhaler to become "exhausted" in a much shorter time.

I prefer to prepare the liquid for the absorbent material of the intermediate compartment by dissolving menthol powder in alcohol, with which solution the pumicestone or other absorbent material is saturated. While I prefer to use menthol in the intermediate compartment on account of its excellent medicinal properties, obviously if desired, the material in this intermediate compartment may be impregnated with some highly flavored fluid, such as extract of peppermint, or any other extract which would give the desired flavor to the inhaled vapors.

It will be understood that the pumice stone or other absorbent material for the different compartments is prepared with the different chemicals in great quantities, and then placed in suitable proportions in the inhalers, but the relative proportion of the liquids used to impregnate the pumice stone used in each inhaler is preferably about 9% of concentrated ammonia and 41% of menthol to about 50% of hydrochloric acid. These are the proportions which seem best suited in the manufacture of the inhaler as now constructed by me, but obviously the proportion of the chemicals may be varied according to the desired use of the same without departing from my invention, and I do not wish to be understood as limiting myself to any specific proportions of the ingredients used.

Having thus described my invention, what I claim as new and desire to secure by Letters Patent, is:

1. In an inhaler, the combination of a tube, a plurality of substantially air-tight readily perforable transverse partitions dividing the tube into substantially air-tight chemical-holding compartments, and absorbing media in two or more of said compartments impregnated with suitable volatile liquids.

2. In an inhaler, the combination of a tube, a plurality of substantially air-tight, readily perforable transverse partitions comprising a wax and a hardening and adhesive substance, for dividing the tube into substantially air-tight chemical-holding compartments, and absorbing media in said compartments impregnated with suitable volatile liquids.

In testimony whereof, I have signed my name to this specification, in the presence of two subscribing witnesses.

IGNAZIO BUCCERI.

Witnesses:
 FRANCISCO RICART,
 S. M. WARD, Jr.